3,062,718
STABLE AQUEOUS STREPTOMYCIN-PENICILLIN COMPOSITION

Allen J. Spiegel, New York, N.Y., assignor to Chas. Pfizer & Co., Inc., New York, N.Y., a corporation of Delaware
No Drawing. Filed Oct. 27, 1959, Ser. No. 848,925
5 Claims. (Cl. 167—65)

This invention relates to injectable pharmaceutical compositions and more particularly to aqueous compositions of streptomycin and penicillin having enhanced stability.

Penicillin and streptomycin, in view of their complementary antimicrobial activities, are a highly desirable combination of antibiotics, for example, in the treatment of certain disease of mixed bacterial origin and in surgical prophylaxis. However, it has usually been found that when a penicillin salt such as procain penicillin is combined with streptomycin in an aqueous formulation suitable for parenteral administration, antibiotic decomposition commences. As they degrade, such preconstituted preparations darken in color, and the penicillin, initially present in suspension, begins to dissolve. The product eventually assumes a jelly-like consistency and becomes entirely worthless. Therefore, where the two antibiotics have been combined in the past it has generally been necessary to furnish a dry formulation for extemporaneous dilution, a procedure which is, of course, inconvenient for the physician.

Now is has been discovered that these problems can be overcome by preparing an aqueous formulation of streptomycin and the penicillin salt of the antihistamine, 1-p-chlorobenzyl-2-N-pyrrolidyl methylbenzimidazole. The preparations are stable for remarkably long periods; not only under refrigeration, but even at room temperature and at moderately elevated temperatures such as are sometimes encountered in storage, the penicillin remains in suspension and potency retention of both antibiotics is excellent.

1-p-chlorobenzyl-2 - N-pyrrolidyl methylbenzimidazole and its salts are described in U.S. Patent 2,689,853. The penicillin salt of this substance may be prepared by combining substantially equimolar proportions of 1-p-chlorobenzyl-2-N-pyrrolidyl methylbenzimidazole hydrochloride and an alkali-metal penicillin salt, such as potassium penicillin, in aqueous solution and filtering off the resulting 1-p-chlorobenzyl - 2 - N - pyrrolidyl methylbenzimidazole penicillin. Clinical tests establishing the excellent local and general tolerance and therapeutic effectiveness which characterize this form of penicillin have been reported by Muckter et al. in Antibiotics Annual, 1956–1957, pages 269–273.

For purposes of the present invention this product is combined with a pharmaceutically acceptable streptomycin salt, such as streptomycin phosphate or the more readily available streptomycin sulfate. The antibiotic levels may vary over a wide range of therapeutically effective concentrations without departing from the spirit of the invention. In the case of the penicillin salt, ordinarily a concentration of at least about 100,000 penicillin units per ml. is desirable, while no more than about 600,000 units per ml. will ordinarily be required. In the case of streptomycin, the concentration employed will usually represent at least about 100 mg. of streptomycin activity (as streptomycin base) per ml., and no more than about 400 mg. per ml. will ordinarily be required. If desired, a portion, for example 50%, of the streptomycin may be replaced by a dihydrostreptomycin salt such as dihydrostreptomycin sulfate.

For optimum stability the aqueous preparation containing these two antibiotics should be substantially neutral. For best results it is adjusted to a pH between about 5 and 8, and preferably between about 6 and 7. In order to achieve and maintain such pH values a non-toxic buffer such as sodium citrate may advantageously be employed. Although the formulations described possess very good inherent stability, it is desirable for optimum results that a stabilizing amount of an antioxidant be included in the formulation. Such additive should, of course, be pharmaceutically acceptable, that is, free from adverse effect on the patient at the level of ordinary use. A wide variety of suitable stabilizers are available, including, for example, various sulphur-containing antioxidants such as thioglycerol and the salts of sulfurous and hydrosulfurous acids and their aldehyde addition products. Among the latter are the alkali-metal bisulfites, metabisulfites, hydrosulfites and formaldehyde sulfoxylates. A particularly good stabilizer is sodium formaldehyde sulfoxylate. Only a minor proportion, usually from about 0.1 to about 2%, of such additive is sufficient to obtain optimum results.

In addition to the previously described ingredients, minor amounts of other additives may also be included for various purposes. Thus, viscosity control, suspension stabilization and improved drainage properties may be achieved where required by incorporating minor amounts of various thickening agents, dispersants and the like, such as, for example, polyvinylpyrrolidone, sodium carboxymethylcellulose, lecithin and the commercially available polyoxyethylene derivatives of fatty acid partial esters of polyolanhydrides such as the sorbitans. It may also be desirable to incorporate a preservative in order to prevent the growth of microorganisms which are not sensitive to the contained antibiotics. Molds may sometimes be troublesome if preservatives are not employed. A variety of such agents known in the art are suitable, including calcium propionate, sodium propionate, the lower alkyl esters of parahydroxybenzoic acid, cinnamaldehyde, and quaternary ammonium type preservatives such as benzalkonium chloride and the like.

For parenteral use the compositions of the present invention will be formulated with sterile ingredients and compounded and packaged aseptically. The new formulations are particularly suitable for intramuscular use; they may be administered to man and animals at conventional dosage levels for treatment of infections due to microorganisms sensitive to the contained antibiotics. These preparations remain stable and light in color for long periods of storage at room temperature and in accelerated tests at elevated temperature. For example, even after 12 weeks at 37° C. about 86% of the streptomycin activity and about 82% of the penicillin activity is typically retained. Similar formulations prepared with procaine penicillin are completely degraded under these conditions.

The following examples are provided solely by way of illustration and should not be interpreted as limiting the invention, the scope of which is defined by the appended claims.

Example 1

| | Gm. |
|---|---|
| Streptomycin sulfate [1] | 34.00 |
| 1-p-chlorobenzyl-2-N-pyrrolidyl methylbenzimidazole penicillin G [2] | 20.40 |
| Sodium citrate | 1.259 |
| Polyvinylpyrrolidone | 0.500 |
| Lecithin | 0.250 |
| Sodium formaldehyde sulfoxylate | 0.500 |
| Butyl parahydroxybenzoate | 0.015 |
| Water to make 100 ml. | |

[1] 750 mg. streptomycin base activity per gm.
[2] 1000 penicillin units per mg.

The above ingredients are combined and thoroughly dispersed to obtain a preparation having a pH of about 6.5 and containing 250 mg. streptomycin activity and 200,000 penicillin units per ml., plus 2% overage.

After 12 weeks at 37° C. streptomycin activity retention is about 86% and penicillin activity retention about 82%.

*Example II*

The preparation of Example I is repeated with the substitution of procane penicillin for the penicillin salt of the first example.

Within 12 weeks at 37° C. both antibiotics are substantially completely inactivated and the preparation is degraded to a jelly.

*Example III*

Streptomycin phosphate in equivalent proportion is substituted for the streptomycin sulfate of Example I and a preparation of excellent stability is again obtained.

*Example IV*

The preparation of Example I is repeated, with the replacement of half of the streptomycin sulfate with an equivalent proportion of dihydrostreptomycin sulfate. The resulting formulation exhibits excellent stability characteristics.

*Example V*

|  | Gm. |
|---|---|
| Streptomycin sulfate | 13.60 |
| 1-p-chlorobenzyl-2-N-pyrrolidyl methylbenzimidazole penicillin G | 61.20 |
| Sodium citrate | 1.259 |
| Polyvinylpyrrolidone | 0.500 |
| Lecithin | 0.250 |
| Sodium bisulfite | 0.500 |
| Butyl parahydroxybenzoate | 0.015 |
| Water to make 100 ml. | |

This preparation is found to have excellent stability upon storage.

*Example VI*

|  | Gm. |
|---|---|
| Streptomycin sulfate | 54.40 |
| 1-p-chlorobenzyl-2-N-pyrrolidyl methylbenzimidazole penicillin G | 10.20 |
| Sodium citrate | 1.259 |
| Polyvinylpyrrolidone | 0.500 |
| Lecithin | 0.250 |
| Sodium metabisulfite | 0.500 |
| Butyl parahydroxybenzoate | 0.015 |
| Water to make 100 ml. | |

This preparation is found to exhibit excellent physical and antibiotic stability.

What is claimed is:

1. An injectable pharmaceutical composition comprising therapeutically effective concentrations of 1-p-chlorobenzyl-2-N-pyrrolidyl methylbenzimidazole penicillin salt and of a pharmaceutically acceptable streptomycin salt, together with a stabilizing amount of a pharmaceutically acceptable antioxidant in a substantially neutral aqueous vehicle therefor.

2. A composition as claimed in claim 1 wherein said penicillin salt concentration is equivalent to from about 100,000 to about 600,000 penicillin units per ml. and said streptomycin salt concentration is equivalent to from about 100 to about 400 mg. of streptomycin activity per ml.

3. A composition as claimed in claim 1 wherein said streptomycin salt is streptomycin sulfate.

4. A composition as claimed in claim 1 which includes dihydrostreptomycin sulfate.

5. An injectable pharmaceutical composition comprising 1-p-chlorobenzyl-2-N-pyrrolidyl methylbenzimidazole penicillin salt equivalent to about 200,000 penicillin units per ml., streptomycin sulfate equivalent to about 250 mg. of streptomycin activity per ml. and a stabilizing amount of sodium formaldehyde sulfoxylate in an aqueous vehicle at a pH of from about 5 to about 8.

References Cited in the file of this patent

UNITED STATES PATENTS

| 2,473,339 | Kirchmeyer | June 19, 1949 |
| 2,719,812 | Hanus | Oct. 4, 1955 |
| 2,720,482 | Bryan et al. | Oct. 11, 1955 |
| 2,750,379 | Hanslick et al. | June 12, 1956 |
| 2,776,279 | Muckter et al. | Jan. 1, 1957 |
| 2,939,818 | Berger | June 7, 1960 |

OTHER REFERENCES

Antibiotics Annual, 1956–1957, "A New Antihistamine Penicillin Salt," Muckter et al., pp. 269–273.

Wilson et al.: "Textbook of Organic Medicinal and Pharmaceutical Chemistry," 2nd Ed., 1954, J. B. Lippincott Co., Phila., Pa., pp. 487–488.

Higuchi et al.: "Reactivity of Bisulfite With a Number of Pharmaceuticals," J. Am. Pharm. Ass'n., Sci. Ed., vol. XLVIII, No. 9, September 1959, pp. 535–540.